United States Patent
Srinivas et al.

(10) Patent No.: US 9,817,837 B2
(45) Date of Patent: Nov. 14, 2017

(54) METHOD AND SYSTEM FOR FILE STORAGE AND ACCESS

(71) Applicant: Texas Instruments Incorporated, Dallas, TX (US)

(72) Inventors: Madan Srinivas, Trivandrum (IN); Veeramanikandan Raju, Bangalore (IN); Keshava Munegowda, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/413,048

(22) Filed: Jan. 23, 2017

(65) Prior Publication Data

US 2017/0132240 A1 May 11, 2017

Related U.S. Application Data

(63) Continuation of application No. 14/075,757, filed on Nov. 8, 2013, now Pat. No. 9,569,447.

(51) Int. Cl.
*G06F 17/30* (2006.01)

(52) U.S. Cl.
CPC .. *G06F 17/30109* (2013.01); *G06F 17/30094* (2013.01); *G06F 17/30203* (2013.01)

(58) Field of Classification Search
CPC ................................................ G06F 17/30109
See application file for complete search history.

(56) References Cited

U.S. PATENT DOCUMENTS

| | | | |
|---|---|---|---|
| 5,715,455 A | 2/1998 | Macon, Jr. et al. | |
| 7,350,049 B1 | 3/2008 | Li et al. | |
| 8,607,016 B2 | 12/2013 | Conley et al. | |
| 2006/0129749 A1 | 6/2006 | Nakanishi et al. | |
| 2013/0179626 A1 | 7/2013 | Chang et al. | |
| 2014/0181371 A1 | 6/2014 | Thomas | |

*Primary Examiner* — Kris Mackes
(74) *Attorney, Agent, or Firm* — Kenneth Liu; Charles A. Brill; Frank D. Cimino

(57) ABSTRACT

Disclosed embodiments relate to storing and accessing files. In an embodiment, a method includes writing a file to a writing a file to a storage device having a file system having a file allocation table (FAT). Writing the file includes allocating a plurality of clusters of the file system to the file, wherein at least a portion of the allocated clusters is contiguous. The FAT includes a plurality of cluster addresses corresponding to the allocated clusters. A signature value is stored in a cluster address corresponding to a first cluster of the contiguous clusters to indicate the presence of the contiguous clusters. In each of a set of consecutive cluster addresses succeeding the cluster address corresponding to the first cluster, a value that partially represents the number of the contiguous clusters is stored. The number of contiguous clusters is determinable by combining the values stored in the consecutive cluster addresses.

20 Claims, 5 Drawing Sheets

METHOD AND SYSTEM FOR FILE STORAGE AND ACCESS

CROSS-REFERENCE TO RELATED APPLICATION

The present application is a continuation of and claims priority to U.S. patent application Ser. No. 14/075,757 filed on Nov. 8, 2013, which is incorporated herein by reference.

TECHNICAL FIELD

The present disclosure generally relates to the field of file access from storage devices.

BACKGROUND

Electronic devices, such as laptops, smartphones, tablet computers and the like, include built-in storage media for data storage purposes. Examples of such storage media may include, hard disk drives, read only memory (ROM), random access memory (RAM), and the like. Allocation of storage space within the storage media is typically managed in the electronic devices using computer file systems such as a file allocation table (FAT) file system. The FAT file system maintains a file allocation table (also referred to herein as "FAT") as a directory of the contents of the storage media. Each storage location (for example, a block or a cluster of the storage space) in the storage media is associated with a corresponding entry in the FAT.

During a file write operation, a number of clusters are allocated either sequentially or in a random manner, based upon the availability of the storage space, to the file. Accordingly, the file is associated with a number of FAT entries indicating the cluster numbers including content corresponding to the file. During a file read operation, a FAT entry associated with a starting cluster of the file is located from another file directory maintained by the FAT file system. The FAT entry associated with the starting cluster of the file identifies a cluster number of a second cluster of the file. The FAT entry of the second cluster identifies a cluster number of a third cluster of the file, and so on and so forth. Accordingly, in order to access a file stored in the storage media, the FAT file system reads the FAT entries (irrespective of whether the clusters are contiguously allocated or not) in order to identify the clusters associated with the file. As a result of repeated back and forth switching between the reading of the FAT entry and the reading of the cluster from the storage media by the FAT file system, a file read performance is degraded.

U.S. patent application Ser. No. 12/389,391, titled "Contiguous file allocation in an extensible file system" and filed on Feb. 20, 2009, suggests a use of stream directory for an extensible file system (exFAT). Stream extension directory entries include general secondary flags to indicate that the clusters associated with the file are logically or physically contiguous on the storage media. This scheme improves the file read performance. The U.S. patent application Ser. No. 12/612,178, titled "Interface techniques providing contiguous storage for files" and filed on Nov. 4, 2009, suggests a use of a directory structure in an exFAT file system. The U.S. Pat. No. 8,321,439, titled "Quick filename lookup using name hash" and filed on Feb. 20, 2009, suggests a use of stream extension directory in the exFAT file system. However, the techniques suggested in these references are not applicable to FAT file systems as the stream extension directory entries are not FAT file system compatible. Accordingly, the stream extension directory entries corrupt the FAT file system and hence this method is restricted only to the exFAT file system.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Disclosed embodiments include various methods, systems and computer readable media for storing files in and accessing files from a storage device. In an embodiment, a method includes writing a file to a writing a file to a storage device having a file system that includes a file allocation table (FAT). Writing the file to the storage device includes allocating a plurality of clusters of the file system to store the file, wherein at least a portion of the allocated plurality of clusters is contiguous, and wherein the FAT comprises a plurality of cluster addresses corresponding to the allocated plurality of clusters, storing a signature value in a cluster address corresponding to a first cluster of the contiguous clusters, the signature value indicating the presence of the contiguous clusters, and storing, in each of a set of consecutive cluster addresses succeeding the cluster address corresponding to the first cluster of the contiguous clusters, a value that partially represents the number of the contiguous clusters, wherein the number of contiguous clusters is determinable by combining the values stored in each of the set of consecutive cluster addresses.

In another embodiment, a file system is disclosed. The file system includes a storage device configured to store a file, a memory configured to store a set of instructions, a processing module communicatively associated with the storage device and the memory, the processing module configured to execute the set of instructions to store the file to the storage device. Storing the file in response to execution of the set of instructions includes allocating a plurality of clusters of a file system of the storage device for storing the file, wherein at least a portion of the allocated plurality of clusters is contiguous, and wherein a file allocation table (FAT) of the file system includes a plurality of cluster addresses corresponding to the allocated plurality of clusters, storing the file into the allocated plurality of clusters, storing a signature value in a cluster address corresponding to a first cluster of the contiguous clusters, the signature value indicating the presence of the contiguous clusters, and storing, in each of a set of consecutive cluster addresses succeeding the cluster address corresponding to the first cluster of the contiguous clusters, a value that partially represents the number of the contiguous clusters, wherein the number of contiguous clusters is determinable by combining the values stored in each of the set of consecutive cluster addresses.

Other aspects and example embodiments are provided in the drawings and the detailed description that follows.

The drawings referred to in this description are not to be understood as being drawn to scale except if specifically noted, and such drawings are only example in nature.

DETAILED DESCRIPTION

Pursuant to an example scenario, allocation of storage space in a storage media is typically managed using computer file systems such as a file allocation table (FAT) file system. The FAT file system maintains a file allocation table (also referred to herein as FAT) as a directory of contents of the storage media. Each storage location (for example, a block or a cluster of storage space) in the storage media is associated with a corresponding entry in the FAT. An example FAT file system architecture is explained with reference to FIG. 1.

Figure 1:
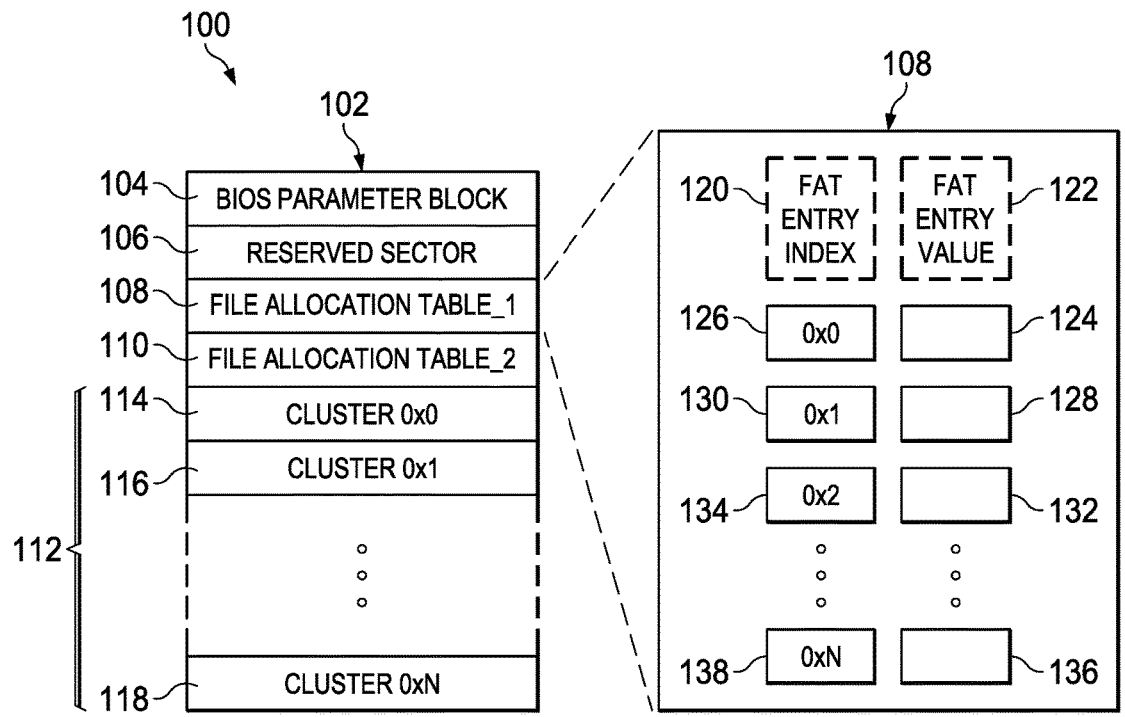
FIG. 1 is a block diagram of an example file allocation table (FAT) file system architecture associated with a storage device in accordance with an example scenario.

FIG. 1 is a block diagram of example FAT file system architecture 100 associated with a storage device in accordance with an example scenario. In an example scenario, the storage device is included within an electronic device. In an embodiment, the storage device is external to the electronic device and is configured to be remotely accessed by the electronic device. Examples of the storage device include, but are not limited to, mechanical storage devices such as hard disk drives and various forms of non-volatile memory devices (for example, read only memory (ROM), electrically erasable programmable ROM (EEPROM)) and volatile memory devices (for example, random access memory (RAM), double data rate synchronous RAM (DDR SRAM)). The FAT file system architecture 100 may be employed in the electronic device for managing allocation of storage space associated with the storage device. The FAT file system architecture 100 is compatible with Microsoft's Windows operating system and with such similar operating systems employed in electronic devices. Examples of the electronic device may include (1) computing devices, such as personal computers (PCs), laptops, tablet PCs and the like (2) multimedia devices, such as Smartphones, gaming consoles and the like, and (3) consumer electronic devices like set-top boxes, digital cameras, camcorders and the like. In an example scenario, the FAT file system architecture 100 is a FAT32 file system architecture with 32 bit addressing scheme for addressing storage locations (for example, clusters) in the storage device.

The FAT file system architecture 100 depicts a logical storage structure 102 for the storage device. The logical storage structure 102 depicts a basic input-output system (BIOS) parameter block (BPB) 104, a reserved sector 106, a file allocation table_1 108, a file allocation table_2 110, and a cluster block 112. The BPB 104 is also referred to as a boot sector or a volume boot record. The BPB 104 includes a bootstrap program along with volume description information. The reserved sector 106 includes one or more sectors or a first sector of a FAT volume as reserved sectors. In one example scenario, the reserved sector 106 of the logical storage structure 102 may include the BPB 104 and a backup copy of the BPB 104. The file allocation table_1 108 provides a map of the clusters associated with the storage device. The file allocation table_2 110 is a backup copy of the file allocation table_1 108. The cluster block 112 includes multiple clusters, such as a cluster 114 (depicted as cluster 0×0 in FIG. 1), a cluster 116 (depicted as cluster 0×1 in FIG. 1) up to cluster 118 (depicted as cluster 0×N in FIG. 1). The clusters are configured to store data corresponding to one or more files stored in the storage device.

Each cluster from among the clusters in the cluster block 112 is represented by an entry in the file allocation table_1 108 (hereinafter referred to as the FAT 108). A simplified structure of the FAT 108 is depicted in an inset view of FIG. 1. The FAT 108 includes a plurality of indices with corresponding FAT entries. More specifically, the indices are disposed in a column labeled as "FAT entry index" 120, and the corresponding FAT entries are disposed in an adjoining column labeled as "FAT entry value" 122. Each entry in the FAT 108 corresponds with (or maps to) a cluster within the cluster block 112. For example, a FAT entry 124 is associated with the cluster 0×0 (for example, the cluster 114) of the storage device as indicated by the FAT entry index 126, which includes the value 0×0. A next FAT entry, for example FAT entry 128, is associated with a next cluster of the storage device, for example the cluster 0×1 (or the cluster 116) as indicated by the FAT entry index 130 which includes the value 0×1, a FAT entry 132 is associated with a cluster 0×2 as indicated by the FAT entry index 134 which includes the value 0×2, and so on and so forth till a last FAT entry 136 which is associated with the last cluster 118 (for example, the cluster 0×N) as indicated by the FAT entry index 138 which includes the value 0×N, is encountered. Accordingly, each FAT entry includes a FAT entry index and a FAT entry value.

In an example scenario, each FAT entry, such as any of the FAT entries 124, 128, 132 or 136, includes a cluster address representing another physical cluster on the storage device (for example, a location of a next cluster of the file). In an example scenario, the FAT entry may include an end of file marker indicating that the corresponding cluster is an ending cluster of the file. In an example scenario, the FAT entry may correspond to a zero value to indicate that a represented cluster is empty (for example, to represent that the corresponding cluster in the storage device is unallocated). Accordingly, for a particular cluster of a file that is stored on storage device, its cluster number (where it is stored on the storage device) serves as an index to the FAT 108, and a value stored at this FAT entry includes the cluster address representing where the next cluster of the file is stored on the storage device.

In an embodiment, the FAT file system architecture 100 may further include a directory (not shown in FIG. 1), for example a directory including 32-byte entries, that includes file attribute information corresponding to the files stored in the storage device. For example, the 32-byte directory includes file name, information regarding last instance of saving of the file to the storage device, a cluster number identifying a first cluster of the file and the like.

During a file write operation, a number of clusters may be allocated either sequentially or in a random manner, depending upon availability of the storage space. Accordingly, the file is associated with a number of FAT entries indicating the clusters including content corresponding to the file. During a file read operation, a FAT entry associated with a starting cluster of the file is located from the directory maintained by the FAT file system. The FAT entry associated with the starting cluster of the file identifies the cluster number of the second cluster of the file. The FAT entry of the second cluster identifies the cluster number of the third cluster of the file and so on and so forth. Accordingly, for accessing a file stored in the storage media, the FAT file system reads the FAT entries (irrespective of whether the clusters are contiguously allocated or not) to identify the clusters associated with the file. As a result of repeated back and forth switching between reading a FAT entry and reading a cluster from the storage media by the FAT file system, a file read performance is degraded. Various embodiments of the present technology, however, provide methods, systems, and computer-readable media for accessing the files stored in the storage device that are capable of overcoming these and other obstacles and providing additional benefits.

Figure 2:
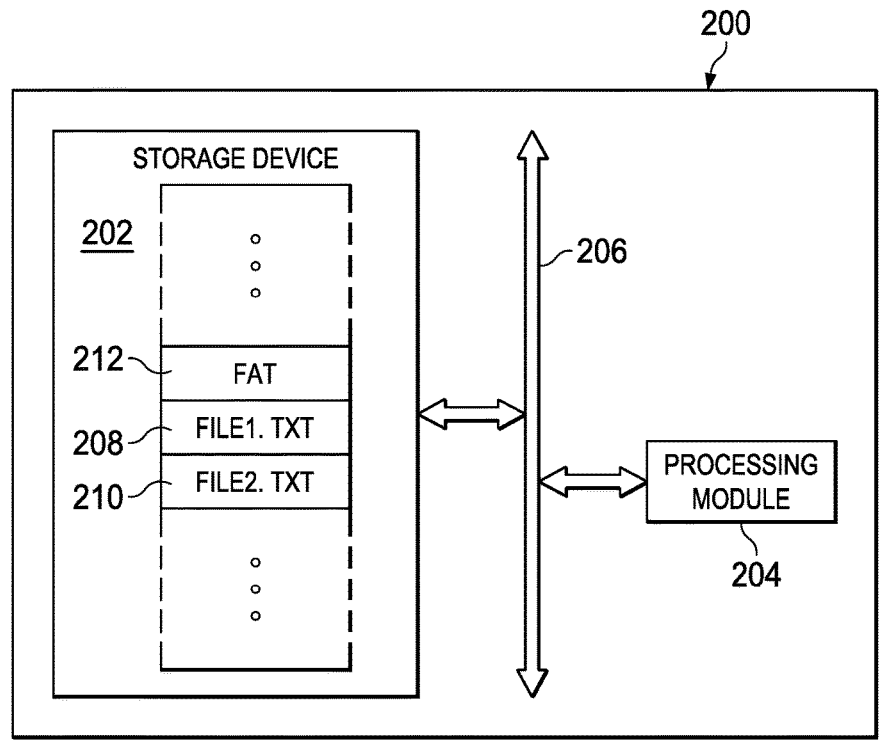
FIG. 2 is a simplified block diagram of an example file access system in accordance with an embodiment.

FIG. 2 is a simplified block diagram of an example file access system 200, in accordance with an embodiment. In an embodiment, the file access system 200 (hereinafter referred to as system 200) may be included within an electronic device, such as the electronic device as explained with reference to FIG. 1. In FIG. 2, the system 200 is depicted to include a storage device 202 and a processing module 204. The storage device 202 and the processing module 204 are communicatively associated with each other via a bus 206. Examples of the bus 206 may include, but are not limited to, a data bus, a control bus and the like. The bus 206 may be, for example, a serial bus, a unidirectional bus or a bi-directional bus. In an embodiment, various components of the system 200, such as the storage device 202, the processing module 204 and the bus 206 may be implemented as hardware, software, firmware or any combination thereof.

In FIG. 2, a storage space (for example, multiple clusters) associated with the storage device 202 is allocated using a computer file system, such as the FAT file system explained with reference to the FAT file system architecture 100 in FIG. 1. In an example embodiment, the computer file system is a FAT32 file system. In an embodiment, the clusters associated with the storage device 202 store content such as textual content, image content, audio/video content or any combination thereof. In FIG. 2, the storage device 202 is depicted to store a plurality of files such as FILE1.txt 208 and FILE2.txt 210. It is understood that a plurality of clusters from among the clusters in the storage device 202 may be allocated to each file from among the plurality of files. The storage device 202 is further configured to include a FAT 212, which includes a plurality of FAT entries maintaining a record of cluster numbers allocated to various files stored in the storage device 202. Examples of the storage device 202 include, but are not limited to, a random access memory (RAM), a synchronous dynamic RAM (SDRAM), a double data rate SDRAM (DDR SDRAM), and the like.

In an embodiment, the processing module 204 is configured to access a file from among the plurality of files stored in the storage device 202. In an embodiment, the processing module 204 may be embodied as a multi-core processor, a single-core processor, or a combination of one or more multi-core processors and one or more single-core processors. For example, the processing module 204 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 204 may be configured to execute hard-coded functionality. In an embodiment, the processing module 204 may be embodied as an executor of software instructions, wherein the instructions may specifically configure the processing module 204 to perform the algorithms and/or operations described herein when the instructions are executed. The processing module 204 may include, among other things, a clock, an arithmetic logic unit (ALU) and logic gates configured to support an operation of the processing module 204. In an embodiment, the processing module 204 may be an advanced reduced instruction set computer (RISC) machine (ARM) processor.

In an embodiment, the processing module 204 is configured to identify a FAT entry corresponding to a starting cluster from among the plurality of clusters associated with a file. The accessing of the file is explained hereinafter with reference to the FILE1.txt 208 (hereinafter referred to as the file 208). It is noted that though accessing of the files is explained herein using an example of file 208 including textual content, the accessing of the files may not be limited to files including textual content only and that files including any content type, such as graphic content, audio content, video content or any combination thereof, may be accessed in a similar manner. The starting cluster is identified based on file attribute information corresponding to the file 208 stored in the storage device 202. As explained with reference to FIG. 1, the storage device 202 includes a directory that includes file attribute information, such as file name, starting cluster of the file and the like, corresponding to each file stored in the storage device 202. The processing module 204 is configured to access a directory entry corresponding to the file 208 in the directory stored in the storage device 202 and identify the starting cluster of the file 208. The processing module 204 is further configured to identify the FAT entry corresponding to the starting cluster of the file 208 in the FAT 212. More specifically, the processing module 204 is configured to identify the FAT entry from among a plurality of FAT entries in the FAT 212 associated with the computer file system, such as the FAT file system, corresponding to the storage device 202. As explained with reference to FIG. 1, a cluster number associated with each cluster conforms to a FAT entry index associated with the cluster. Accordingly, by identifying the starting cluster corresponding to the file 208, the FAT entry index is determined based on a cluster number associated with the starting cluster. The FAT entry may be identified based on the identified FAT entry index. As explained with reference to FIG. 1, the identified FAT entry includes a cluster address. The cluster address included in the FAT entry includes a plurality of bits. In an embodiment, for a FAT32 file system, the cluster address included in each FAT entry is configured to include 32 bits. The cluster address in the FAT entry associated with the starting cluster of the file identifies a cluster number of a second cluster of the file. A cluster address in the FAT entry of the second cluster identifies a cluster number of a third cluster of the file and so on and so forth. Accordingly, for accessing a file stored in the storage media, the FAT entries are read to identify the clusters associated with the file 208.

In an embodiment, the processing module 204 is configured to read the cluster address to identify a location of a next cluster from among the plurality of clusters allocated to the file 208 in the storage device 202. In an embodiment, one or more bits from among a plurality of bits configuring the cluster address are read to determine a presence of a signature value included within the cluster address. The presence of the signature value is indicative of allocation of a set of contiguous clusters from among the plurality of clusters allocated to the file 208.

In an embodiment, the presence of the signature value is determined based on a pre-specified bit configuration formed by four most significant bits from among the 32 bits configuring the cluster address. For example, in the FAT32 file system, 28 bits from among the 32 bits of the cluster address in each FAT entry are utilized to signify the address of the next cluster corresponding to the file 208. The remaining four most significant bits are reserved in the FAT32 file system architecture. In an embodiment, the reserved most significant bits in the cluster address are utilized to include the signature value which indicates a presence of contiguous clusters allocated to the file 208. More specifically, the reserved most significant bits are configured to form a pre-specified bit configuration, for example any bit configuration like 0001 or 1111, representing a non-zero value, which may signify the presence of the signature value indicating that the file 208 is associated with the contiguous clusters.

In an embodiment, the signature value is indicative of the file 208 being created with the contiguous clusters or appended with the contiguous clusters. For example, during the initial file write operation for writing the file 208 to the storage device 202, the file 208 may not be allocated with the contiguous clusters (for example, allocated with non-contiguous clusters). In such a scenario, the signature value is absent in the cluster address of the FAT entry of the file 208 and the non-contiguous clusters associated with the file 208 are read based on accessing the FAT entries corresponding to the non-contiguous clusters. However, the file 208 may be appended or modified at a later instance in time and during a subsequent write operation for incorporating the modifications to the file 208, the file 208 may be allocated with the contiguous clusters. The signature value is then included within an appropriate cluster address from among the plurality of cluster addresses to reflect that at least some of the clusters corresponding to subsequent/remaining cluster addresses are the contiguous clusters.

In an embodiment, the processing module 204 is configured to compute the number of contiguous clusters allocated to the file 208 based on the determination that the signature value is present. In an embodiment, the number of contiguous clusters allocated to the file 208 is computed based on a pre-determined number of consecutive cluster addresses succeeding the cluster address (for example, the cluster address in which the signature value is determined to be present). In an example scenario, if the signature value is determined to be present in cluster address 3 (for example, cluster address 0×3) indicating the allocation of a set of contiguous clusters from among remaining clusters following the cluster address 3, then the number of clusters in the set of contiguous clusters is determined based on a pre-determined number of consecutive cluster addresses succeeding the cluster address 3, for example, cluster addresses 4, 5, 6 and the like. In an embodiment, the pre-determined number of consecutive clusters succeeding the cluster address is four. Accordingly, the number of contiguous clusters is computed based on four cluster addresses succeeding the cluster address.

In an embodiment, the processing module 204 is configured to concatenate the four most significant bits associated with each of the four cluster addresses to generate a 16-bit value indicative of the number of contiguous clusters allocated to the file 208. Generation of a 16 bit value is further explained with reference to following illustrative example:

If a cluster address of the file 208 is represented as "S", then the cluster address S is read to determine the presence of the signature value. More specifically, the four most significant bits in the cluster address S are read to determine the presence of the signature value as explained above. If the signature value is determined to be present, then a number of contiguous clusters associated with the file 208 is determined based on cluster addresses succeeding the cluster address S, for example, cluster addresses "S+1", "S+2", "S+3" and "S+4". If A represents a value configured by the four most significant bits of the cluster address "S+1", B represents a value configured by the four most significant bits of the cluster address "S+2", C represents a value configured by the four most significant bits of the cluster address "S+3" and D represents a value configured by the four most significant bits of the cluster address "S+4", then a 16-bit value represented by "L" is generated by concatenating D, C, B and A as depicted in equation (1) below:

$$L = 0 \times DCBA \qquad \text{Eq. (1)}$$

The 16-bit value "L" corresponds to the number of contiguous clusters allocated to the file 208. For example, if the 16-bit value "L" corresponds to a number 1000, then the file 208 is allocated with 1000 contiguous clusters following the cluster corresponding to the cluster address S. Accordingly, an ending cluster associated with the contiguous clusters allocated to the file 208 based on the computed number of contiguous clusters is determined for facilitating reading of the contiguous clusters allocated to the file 208. For example, if 'L' represents the number of contiguous clusters and 'SC' represents the cluster number index corresponding to the cluster address S including the signature value, then the cluster number index 'EC' corresponding to the ending cluster is determined as depicted in equation (2) below:

$$EC = L + SC \qquad \text{Eq. (2)}$$

For example, in the above scenario, if a $3^{rd}$ cluster (for example, 'SC' in equation (2)) of the storage device 202 corresponds to the cluster address S of the file 208 and if it is determined that the file 208 is allocated with 1000 contiguous clusters (for example, 'L' in the equation (2)), then the ending cluster is determined to be a $1003^{rd}$ cluster (for example, 'EC' in the equation (2)) in the storage device 202. Accordingly, the processing module 204 reads the clusters contiguously till cluster 1003 without accessing the FAT 212.

In an embodiment, if the 16-bit value corresponds to a pre-determined bit value, then all the remaining clusters from among the plurality of clusters associated with the file are determined to be contiguous. For example, if the 16-bit value corresponds to zero or any such pre-defined value then it is determined that all the clusters allocated to the file 208 are contiguous. The generation of the 16-bit value and the computation of the number of contiguous clusters are further explained with reference to FIG. 3A.

In an embodiment, the 16-bit value is computed as L=0×ABCD in big endian format depending upon requirements of the electronic device housing the system 200. In an embodiment, if the storage device 202 is configured to facilitate inclusion of the contiguous clusters that are larger than $2^{16}$, then the FAT 212 is configured to utilize seven consecutive cluster addresses to derive a 28-bit value. More specifically, in an example scenario, the pre-determined number of consecutive cluster addresses succeeding the cluster address, for computing the number of contiguous clusters, is seven. Accordingly, the four most significant bits associated with each of the seven consecutive cluster addresses are concatenated to generate a 28-bit value indicative of the number of contiguous clusters allocated to the file.

In an embodiment, the processing module 204 is configured to read the contiguous clusters allocated to the file 208 from the storage device 202 based on the computed number of contiguous clusters. As explained above, the 16-bit value (or the 28-bit value) indicates the number of contiguous clusters. The ending cluster of the contiguous clusters is determined based on the computed number of contiguous clusters and the processing module 204 is configured to read the contiguous clusters till the ending cluster is encountered. The processing module 204 is configured to read the contiguous clusters without referencing the FAT 212, thereby improving the file read performance by reducing back and forth switching between reading the FAT 212 and an associated cluster from the among the plurality of clusters. Reading the clusters in such a manner is especially useful for file read mechanical arrangements which are capable of reading large amounts of data disposed on a plurality of clusters in one-go (for example, in instances where the storage device 202 is embodied as a hard disk drive, reading of clusters may be aligned with a rotation of a disk platter to capture large amounts of data in one-go). The improvement of the file read performance may especially be substantial for large files, like multimedia files (for example, video files), where switching back and forth to read the FAT entries may substantially degrade the file read performance.

In an embodiment, the processing module 204 is further configured to read one or more cluster addresses from the FAT 212 for identifying the clusters following the set of contiguous clusters. The processing module 204 determines a presence of the signature value for each reading of the one or more cluster addresses in order to identify an allocation of another set of contiguous clusters from among remaining clusters in the plurality of clusters allocated to the file. For example, if it is determined that the set of contiguous clusters extends up to cluster number 1003 and the file 208 has clusters extending beyond 1003, then the processing module 204 reads the following non-contiguous clusters by reading corresponding cluster addresses from the FAT 212. While reading the cluster addresses of the non-contiguous clusters, the processing module 204 is configured to determine the presence of the signature value in any of the cluster addresses. As explained above, the processing module 204 checks for the presence of a pre-specified bit configuration formed by four most significant bits from among 32 bits configuring the cluster address to determine the presence of the signature value. If it is determined that the signature value is present in any of the cluster addresses, then it is determined that the file 208 is allocated with another set of contiguous clusters. The processing module 204 determines the number of contiguous clusters in another set of contiguous clusters by configuring the 16-bit value (or 28-bit value) as explained above. The processing module 204 then reads other set of contiguous clusters without a need to reference the FAT 212, thereby improving the file read performance. The allocation of two sets of contiguous clusters is explained with reference to FIG. 3B.

In an embodiment, the processing module 204 is configured to determine if the plurality of clusters associated with the file 208 are modified. More specifically, subsequent to initial allocation of the plurality of clusters to the file 208, the processing module 204 monitors any modification to the file 208. In an embodiment, the processing module 204 is configured to update one or more signature values and corresponding number of contiguous clusters if the plurality of clusters allocated to the file 208 is determined to be modified.

As explained, the system 200 may be included in an electronic device, such as a mobile phone, a Smartphone, a tablet PC, a laptop and the like. The system 200 may include components for performing various functions, which are not depicted herein. For example, the system 200 may additionally include components, such as an input unit (e.g., a touch screen panel or a keyboard/keypad), a video display unit (e.g., liquid crystal display (LCD), a cathode ray tube (CRT), and the like), a cursor control device (e.g., a mouse), a drive unit (e.g., a disk drive), a signal generation unit (e.g., a speaker) and/or a network interface unit. The drive unit includes a machine-readable medium upon which is stored one or more sets of instructions (e.g., software) embodying one or more of the methodologies and/or functions described herein. In an embodiment, the software resides, either completely or partially, within the storage device 202, and/or within the processing module 204 during the execution thereof by the system 200, such that the processing module 204 and the storage device 202 also constitute a machine-readable media. The software may further be transmitted and/or received over a network via the network interface unit.

The term "machine-readable medium" may be construed, for example, to include a single medium and/or multiple media (e.g., a centralized and/or distributed database, and/or associated caches and servers) that store the one or more sets of instructions. Moreover, the term "machine-readable medium" may be construed, for example, to include any medium that is capable of storing, encoding and/or carrying a set of instructions for execution by the system 200 and that cause the system 200 to perform any one or more of the methodologies of the various embodiments. Furthermore, the term "machine-readable medium" may be construed to include, but shall not be limited to, solid-state memories, optical and magnetic media, and carrier wave signals. The foregoing notwithstanding, it is noted that the present technology is not limited to any particular definition of "machine-readable medium".

Figure 3A:
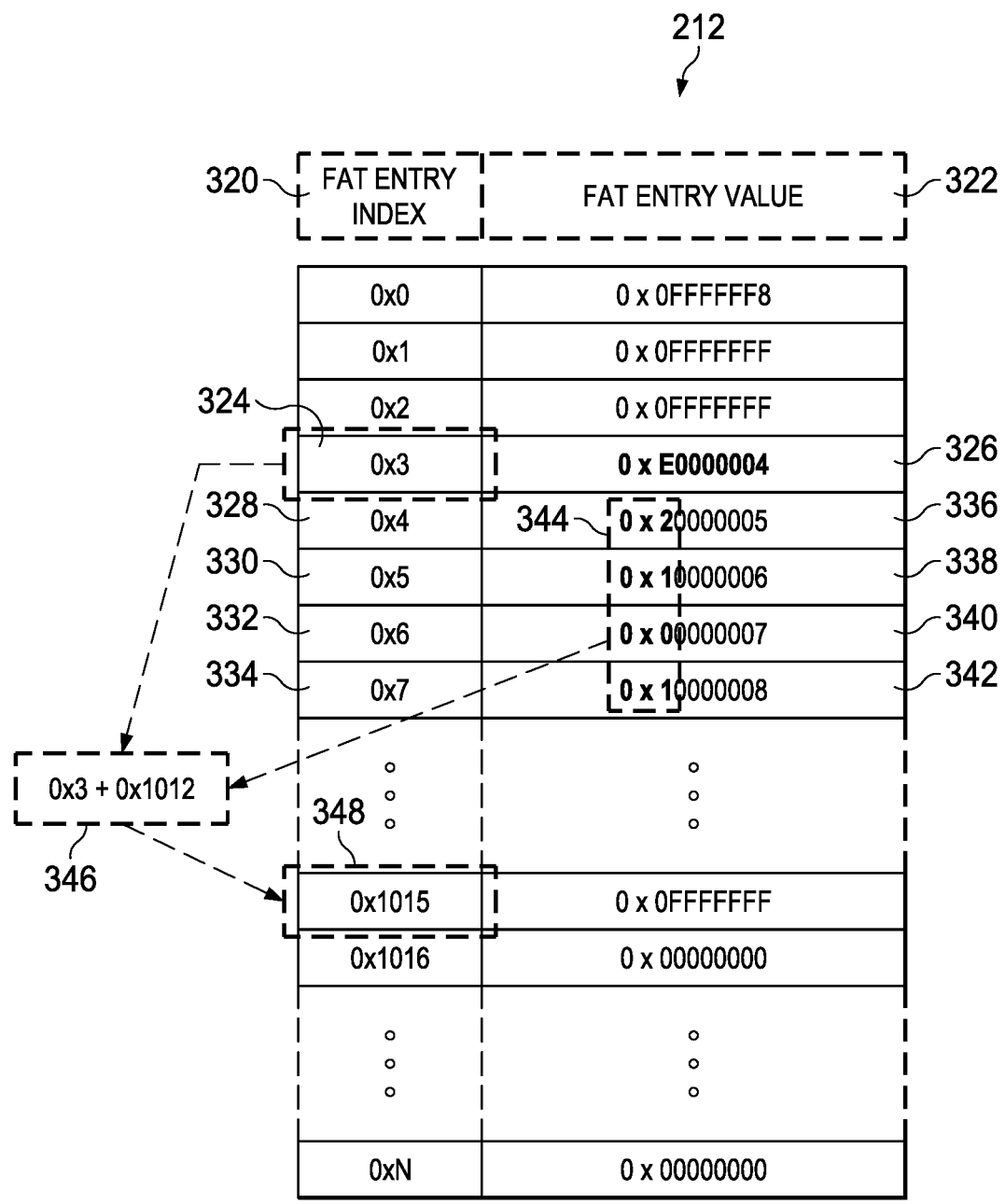
FIG. 3A illustrates an example generation of a 16-bit value from FAT entries in a FAT for computing a number of contiguous clusters allocated to a file in accordance with an example embodiment.

FIG. 3A illustrates an example generation of a 16-bit value from FAT entries in the FAT 212 of FIG. 2 for computing a number of contiguous clusters allocated to the file 208 in accordance with an example embodiment. As explained with reference to FIG. 2, the FAT 212 corresponds to a FAT file system associated with the storage device 202. The FAT 212 includes a plurality of indices with corresponding FAT entries. More specifically, the indices are disposed in a column labeled as "FAT entry index" 320, and, the corresponding FAT entries are disposed in an adjoining column labeled as "FAT entry value" 322. Each fat entry index in the FAT 212 corresponds with (or maps to) a cluster of the storage device 202. For example, FAT entry index 0×5 corresponds to cluster 5 on the storage device 202. Each FAT entry value includes a cluster address for a next cluster in the file. In a FAT32 file system, each FAT entry value is of size 32 bits, for example the FAT entry index 4 is associated with a FAT entry value (or a cluster address) of 0×20000006. As explained with reference to FIG. 2, in the FAT32 file system, 28 bits from among the 32 bits of the cluster address are utilized for referencing the next cluster of a file and 4 most significant bits are reserved (for example, unused).

In FIG. 3A, it is assumed that the processing module 204 of FIG. 2 identifies the starting cluster of a file, such as the file 208, to be three. Accordingly, FAT entry index 324 bearing a value '0×3' corresponding to the starting cluster 3 is identified. The FAT entry value 326 corresponding to the FAT entry index 324 includes a cluster address '0×E0000004'. The most significant bits of the cluster address '0×E0000004' are read to determine the presence of a signature value. The four most significant bits in the cluster address '0×E0000004' include a non-zero value (for example, "E") and hence the signature value is determined to be present in the FAT entry value 326 corresponding to the starting cluster. The determination of the signature value in the FAT entry value 326 signifies the allocation of contiguous clusters to the file 208.

Upon determination of the presence of the signature value, the four most significant bits in cluster addresses succeeding the cluster address in the FAT entry value 326 are read. For example, in FIG. 3A, the four consecutive cluster addresses succeeding the cluster address including the signature value are associated with FAT entry indices 328, 330, 332 and 334 bearing values 0×4, 0×5, 0×6 and 0×7, respectively. The FAT entries corresponding to the FAT entry indices 328, 330, 332 and 334 are FAT entry values 336, 338, 340 and 342 bearing cluster addresses '0×20000006', '0×10000007', '0×00000008' and '1×00000009' respectively. The four most significant bits of each of the four cluster addresses in the FAT entry values 336, 338, 340 and 342 (for example, values 2, 1, 0 and 1) are concatenated to generate a 16-bit hexadecimal value 0×1012 depicted by dotted block 344. Accordingly, the number of contiguous clusters allocated to the file is computed to be 0×1012=4114. The ending cluster index is determined based on the computed number of contiguous clusters as explained with reference to equation (2). For example, in FIG. 3A, the signature value is determined to be present in the $3^{rd}$ cluster (or FAT entry index 3) and it is further determined that 4114 contiguous clusters are allocated to the file 208, then the ending cluster index is computed as explained in equation (2) to be equal to: 3+4114=4117 (as illustrated in inset view by a dotted block 346 depicting the ending cluster computation to be 0×3+0×1012=0×1015=4117). The FAT entry index 348 bearing a hexadecimal value 0×1015 is determined to be FAT entry index of the ending cluster of the contiguous clusters and accordingly the processing module 204 reads 4114 contiguous clusters without accessing the FAT 212, thereby improving the file read performance. It is understood that the presence of the signature value in the starting cluster of the file is depicted herein for example purposes and that the signature value may be included in any cluster address to indicate that the clusters associated with succeeding clusters are contiguous clusters. As explained with reference to FIG. 2, the file 208 may be allocated with more than one set of contiguous clusters. The allocation of two sets of contiguous clusters is explained with reference to FIG. 3B.

Figure 3B:
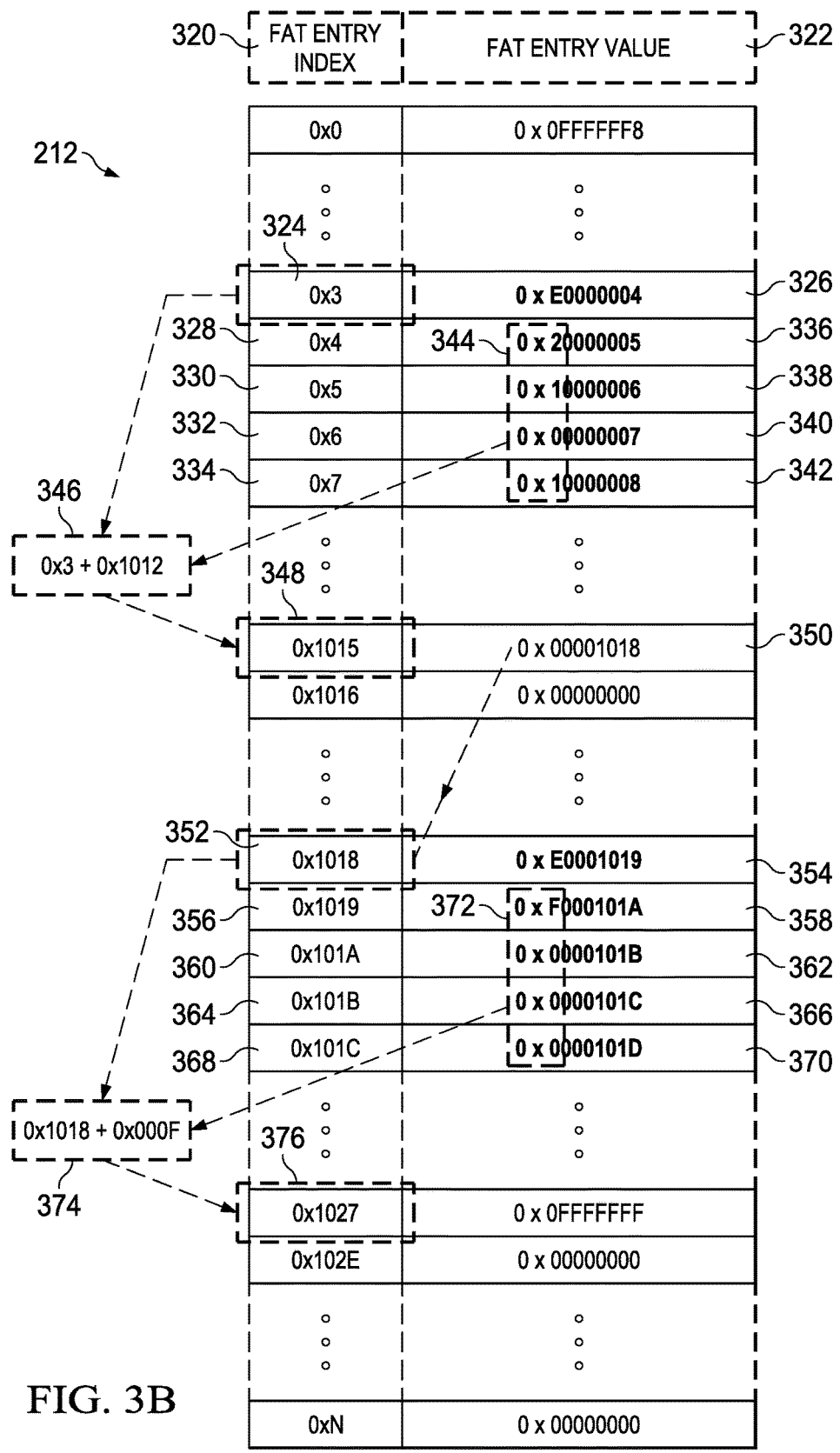
FIG. 3B illustrates an example generation of two 16-bit values from FAT entries in the FAT for computing a number of clusters in each of two sets of contiguous clusters allocated to the file in accordance with an example embodiment.

FIG. 3B illustrates an example generation of two 16-bit values from FAT entries in the FAT 212 of FIG. 2 for computing a number of clusters in each of two sets of contiguous clusters allocated to the file 208 in accordance with an example embodiment. The FAT 212 in FIG. 3B is depicted to be an example extension of FAT 212 depicted in FIG. 3A. In FIG. 3B, it is assumed that the file 208 is allocated with two sets of contiguous clusters and accordingly, the FAT entries corresponding to the file 208 in the FAT 212 include two signature values to indicate the presence of two sets of contiguous clusters. The determination of the first signature value in the cluster address in the FAT entry value 326 along with the computation of the first 16-bit value represented by 16-bit value depicted by dotted block 344 may be performed as explained with reference to FIG. 3A. The ending cluster (for example, cluster 0×1015) of the first set of contiguous clusters represented by FAT entry index 348 is determined from the 16-bit value (as illustrated in the dotted block 346 in the inset view in FIG. 3B) and accordingly, the first set of contiguous clusters are read from the storage device 202 without referring to the FAT 212.

The FAT entry value 350 corresponding to the FAT entry index 348 includes a cluster address 0×00001018 indicating the next cluster number allocated to the file 208. As can be seen from the FAT entries in the FAT 212 in FIG. 3B, the next cluster 0×1018 is non-contiguously allocated or, more specifically, does not succeed cluster 0×1015. The processing module 204, upon reading the first set of contiguous clusters till cluster 0×1015 is encountered, reads the cluster address included in the FAT entry value 350 to identify the next cluster allocated to the file 208. The processing module 204 then reads the FAT entry index 352 (for example, 0×1018) and the FAT entry value 354 corresponding to the FAT entry index 352 to identify the next cluster allocated to the file 208. The processing module 204 reads the four MSB bits in the cluster address 0×E0001019 to determine the presence of a signature value. Upon determining the presence of a pre-specified bit configuration (for example, a non-zero value 0×E) in the four MSB bits in the cluster address, the processing module 204 determines that the file 208 is allocated with another set of contiguous clusters. Upon determination of the presence of the signature value, the four most significant bits in cluster addresses succeeding the cluster address in the FAT entry value 354 are read. For example, the four consecutive cluster addresses succeeding the cluster address in the FAT entry value 354 are associated with FAT entry indices 356, 360, 364 and 368 bearing values 0×1019, 0×101A, 0×101B and 0×101C, respectively. The FAT entry values corresponding to the FAT entry indices 356, 360, 364 and 368 are 358, 362, 366 and 370 bearing cluster addresses '0×F000101A, '0×0000101B', '0×0000101C' and '1×0000101D' respectively. The four most significant bits of each of the four cluster addresses in FAT entry values 358, 362, 366 and 370 (for example, values F, 0, 0 and 0) are concatenated to generate the 16-bit hexadecimal value 0×000F depicted by dotted block 372. As explained with reference to FIGS. 2 and 3A, the 16-bit value corresponds to the number of contiguous clusters allocated to the file 208. Accordingly, the number of contiguous clusters allocated to the file 208 is computed to be 0×000F=15. The ending cluster index is determined based on the computed number of contiguous clusters as explained in equation (2) to be 0×1018+0×000F as illustrated in dotted block 374 in FIG. 3B. For example, the FAT entry index 376 bearing a value 0×1027 is determined to be FAT entry index of the ending cluster of the contiguous clusters and accordingly the processing module 204 reads 15 contiguous clusters without accessing the FAT 212, thereby improving the file read performance.

It is noted that though the indication of the allocation of the contiguous clusters is explained with reference to 16-bit values in FIGS. 3A and 3B, if the storage device 202 is configured to facilitate the inclusion of the contiguous clusters that are larger than $2^{16}$, then the FAT 212 is configured to utilize seven consecutive cluster addresses to derive a 28-bit value. More specifically, the pre-determined number of consecutive cluster addresses succeeding the cluster address including the signature value, for computing the number of contiguous clusters, is seven. Accordingly, four most significant bits associated with each of the seven consecutive cluster addresses are concatenated to generate a 28-bit value indicative of the number of contiguous clusters allocated to the file. The processing module 204 then reads the contiguous clusters without accessing the FAT 212 thereby improving the file read performance. A method for accessing a file stored in a storage device is explained with reference to FIG. 4.

Figure 4:
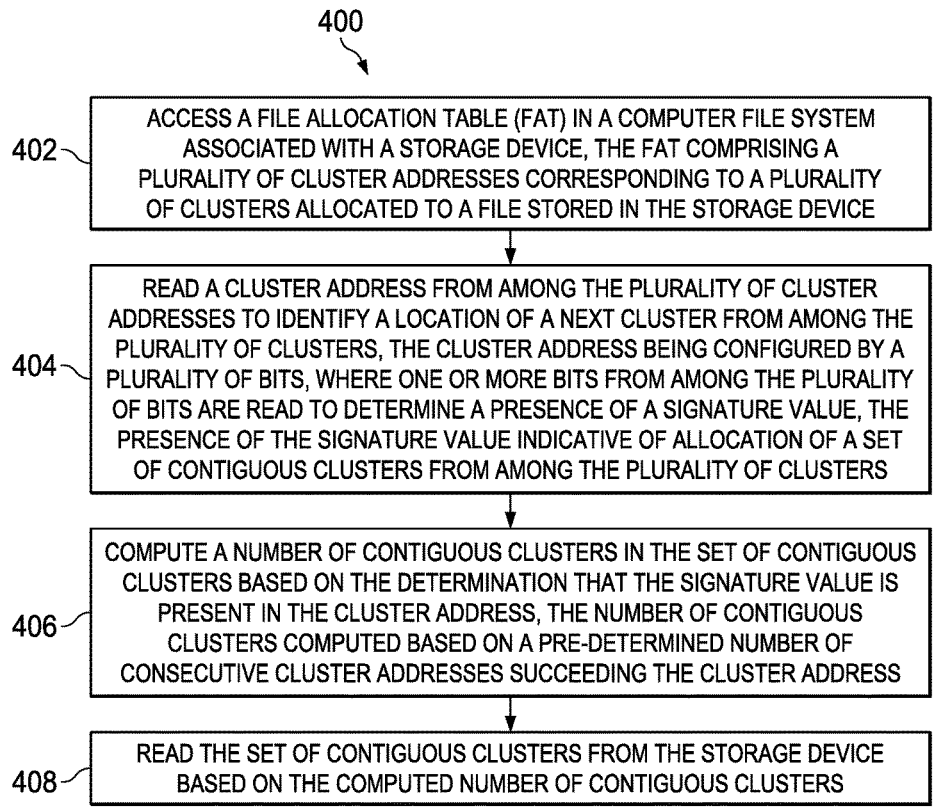
FIG. 4 illustrates a flowchart of an example method for accessing a file stored in a storage device in accordance with an example embodiment.

FIG. 4 illustrates a flowchart of an example method 400 for accessing a file (for example, the file 208 of FIG. 2) from a storage device (for example, the storage device 202) in accordance with an example embodiment. The method 400 depicted in the flowchart may be executed by, for example, the system 200 explained with reference to FIG. 2. Operations of the flowchart, and combinations of operation in the flowchart, may be implemented by, for example, hardware, firmware, a processor, circuitry and/or a different device associated with the execution of software that includes one or more computer program instructions. The operations of the method 400 are described herein with help of the system 200. However, the operations of the method can be described and/or practiced by using a system other than the system 200. The method 400 starts at operation 402.

At operation 402, a FAT in a computer file system associated with the storage device is accessed (for example, by the processing module 204 of FIG. 2). The FAT includes a plurality of cluster addresses corresponding to a plurality of clusters allocated to a file stored in the storage device. In an embodiment, a FAT entry corresponding to a starting cluster from among the plurality of clusters associated with the file is identified (for example, by the processing module 204 of FIG. 2). In an embodiment, the starting cluster is identified based on file attribute information corresponding to the file stored in the storage device. As explained with reference to FIG. 1, the storage device includes a directory that includes file attribute information, such as file name, starting cluster of the file and the like, corresponding to each file stored in the storage device. A directory entry corresponding to the file in the directory stored in the storage device is accessed to identify the starting cluster of the file. A FAT entry corresponding to the starting cluster of the file is then identified in the FAT. More specifically, the FAT entry may be identified from among a plurality of FAT entries in the FAT associated with a computer file system, such as the FAT file system. As explained with reference to FIG. 1, a cluster number associated with each cluster conforms to a FAT entry index associated with the cluster. Accordingly, by identifying the starting cluster corresponding to the file, the FAT entry index is determined based on a cluster number associated with the starting cluster. The FAT entry is identified based on the identified FAT entry index. Further, as explained with reference to FIG. 1, the identified FAT entry includes a cluster address. The cluster address included in the FAT entry includes a plurality of bits. In an embodiment, for a FAT32 file system, the cluster address included in each FAT entry is configured to include 32 bits. The cluster address in the FAT entry associated with the starting cluster of the file identifies a cluster number of a second cluster of the file. The cluster address in the FAT entry of the second cluster identifies a cluster number of a third cluster of the file and so on and so forth. Accordingly, for accessing a file stored in the storage media, the FAT entries are read to identify the clusters associated with the file.

At operation 404, a cluster address from among the plurality of cluster addresses is read (for example, by the processing module 204) to identify a location of a next cluster from among the plurality of clusters. The cluster address is configured by a plurality of bits. In an embodiment, one or more bits from among the plurality of bits are read to determine a presence of a signature value. The presence of the signature value is indicative of allocation of a set of contiguous clusters from among the plurality of clusters.

In an embodiment, the presence of the signature value is determined based on a pre-specified bit configuration formed by four most significant bits from among 32 bits configuring the cluster address. For example, in the FAT32 file system, 28 bits from among the 32 bits of the cluster address in each FAT entry are utilized to signify the address of the next cluster corresponding to the file. The remaining four most significant bits are reserved in the FAT32 file system implementation. In an embodiment, the reserved most significant bits in the cluster address are utilized to include the signature value which indicates a presence of contiguous clusters allocated to the file. More specifically, the reserved most significant bits are configured to form a pre-specified bit configuration, for example any bit configuration like 0001 or 1111, representing a non-zero value, which signifies the presence of the signature value indicating that the file is associated with the contiguous clusters.

At operation 406, a number of contiguous clusters in the set of contiguous clusters is computed (for example, by the processing module 204) based on the determination that the signature value is present in the cluster address. In an embodiment, the number of contiguous clusters is computed based on a pre-determined number of consecutive cluster addresses succeeding the cluster address. In an embodiment, the number of contiguous clusters allocated to the file is computed based on a pre-determined number of consecutive cluster addresses succeeding the cluster address (for example, the cluster address in which the signature value is determined to be present). In an example scenario, if the signature value is determined to be present in cluster address 3 (for example, cluster address 0×3) indicating the allocation of a set of contiguous clusters from among remaining clusters following the cluster address 3, then the number of clusters in the set of contiguous clusters is determined based on a pre-determined number of consecutive cluster addresses succeeding the cluster address 3, for example, cluster addresses 4, 5, 6 and the like. In an embodiment, the pre-determined number of consecutive clusters succeeding the starting cluster is four. Accordingly, the number of contiguous clusters is computed based on four cluster addresses succeeding the cluster address.

In an embodiment, the four most significant bits associated with each of the four cluster addresses are concatenated (for example, by the processing module 204) to generate a 16-bit value indicative of the number of contiguous clusters allocated to the file. In an embodiment, the 16-bit value may be computed in big endian format depending upon system requirements. In an embodiment, if the storage device is configured to facilitate the inclusion of contiguous clusters that are larger than $2^{16}$, then the FAT is configured to utilize seven consecutive cluster addresses to derive a 28-bit value. More specifically, the pre-determined number of consecutive cluster addresses succeeding the cluster address, for computing the number of contiguous clusters, is seven. Accordingly, four most significant bits associated with each of the seven consecutive cluster addresses are concatenated to generate a 28-bit value indicative of the number of contiguous clusters allocated to the file. The determination of the 16-bit value (or the 28-bit value) and computation for determining the number of contiguous clusters may be performed as explained with reference to FIGS. 2, 3A and 3B and are not explained herein for sake of brevity.

At operation 408, the set of contiguous clusters is read (for example, by the processing module 204) from the storage device based on the computed number of contiguous clusters. As explained above, the 16-bit value (or 28-bit value) indicates the number of contiguous clusters. The ending cluster of the contiguous clusters is determined based on the computed number of contiguous clusters and the contiguous clusters are read till the ending cluster is encountered. In such a scenario, the contiguous clusters are read without referencing the FAT, thereby improving file read performance by reducing back and forth switching between reading the FAT and an associated cluster from the among the plurality of clusters. Another method of accessing a file stored in a storage device is explained with reference to FIG. 5.

Figure 5:
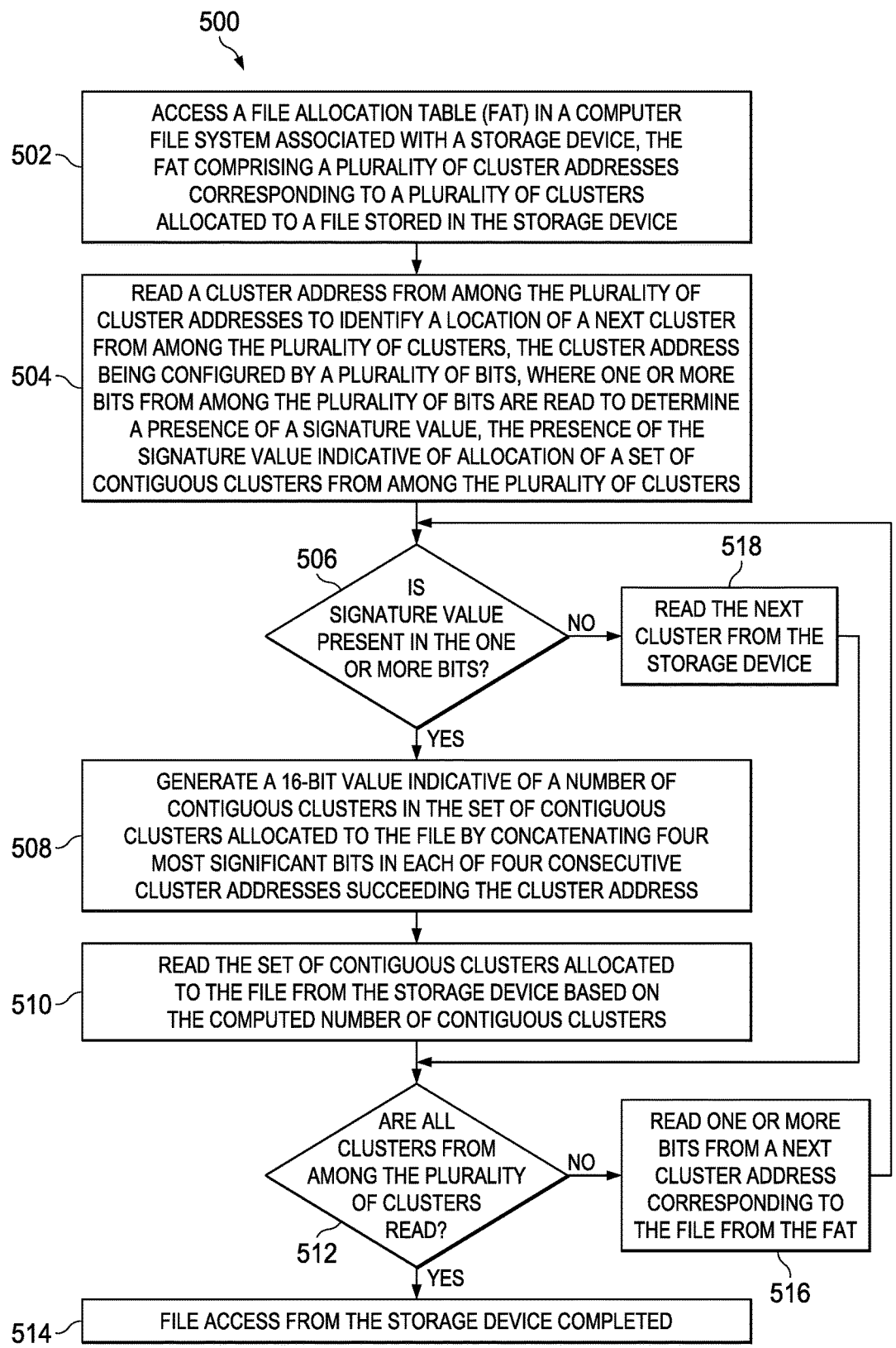
FIG. 5 illustrates a flowchart of an example method for accessing a file stored in a storage device in accordance with another example embodiment.

FIG. 5 illustrates a flowchart of an example method 500 of accessing a file stored in a storage device in accordance with an example embodiment. The method 500 depicted in the flowchart may be executed by, for example, the system 200 explained with reference to FIG. 2. Operations of the flowchart, and combinations of the operations in the flowchart, may be implemented by, for example, hardware, firmware, a processor, circuitry and/or a different device associated with the execution of software that includes one or more computer program instructions. The operations of the method 500 are described herein with help of the system 200. However, the operations of the method 500 can be described and/or practiced by using a system other than the system 200. The method 500 starts at operation 502.

At operation 502, a FAT in a computer file system associated with the storage device is accessed (for example, by the processing module 204 of FIG. 2). The FAT includes a plurality of cluster addresses corresponding to a plurality of clusters allocated to a file stored in the storage device. At operation 504, a cluster address from among the plurality of cluster addresses is read (for example, by the processing module 204) to identify a location of a next cluster from among the plurality of clusters. The cluster address is configured by a plurality of bits. In an embodiment, one or more bits from among the plurality of bits are read to determine a presence of a signature value. The presence of the signature value is indicative of allocation of a set of contiguous clusters from among the plurality of clusters. The operations 502 and 504 are performed as explained with reference to operations 402 and 404 of method 400 in FIG. 4 and are not explained herein for sake of brevity.

At operation 506, it is determined if the signature value is present in the one or more bits. In an embodiment, the one or more bits correspond to the most significant bits from among the plurality of bits associated with the cluster address. In an embodiment, the presence of the signature value is determined based on a pre-specified bit configuration formed by four most significant bits from among the 32 bits configuring the cluster address. For example, the reserved most significant bits in the cluster address conforming to a FAT32 file system are configured to form a pre-specified bit configuration, for example any bit configuration like 0001 or 1111, representing a non-zero value, which signifies a presence of the signature value indicating that the file is associated with contiguous clusters.

If it is determined that the signature value is present in the one or more bits at operation 506, then at operation 508, a 16-bit value indicative of the number of contiguous clusters in the set of contiguous clusters allocated to the file is generated by concatenating four most significant bits in each of four consecutive cluster addresses succeeding the cluster address. The generation of the 16-bit value may be performed as explained with reference to FIGS. 2, 3A and 3B. It is understood that the generation of the 16-bit value is mentioned herein for illustration purposes and that a 28-bit value may also be generated instead of the 16-bit value as explained with reference to FIGS. 2, 3A and 3B. Based on the determined number of contiguous clusters from the generated 16-bit value, at operation 510, the set of contiguous clusters allocated to the file are read from the storage device.

At operation 512, it is determined if all clusters from among the plurality of clusters associated with the file are read. More specifically, at operation 512, it is determined whether any clusters associated with the file are still unread, subsequent to reading the contiguous clusters allocated to the file. If it is determined that there are unread clusters among the plurality of clusters, then at operation 516, one or more bits from a next cluster address corresponding to the file from the FAT are read (for example, by the processing module 204). Upon reading the one or more bits from the next cluster address at 516, at operation 506, it is determined if the signature value is present in the one or more bits. If the signature value is determined to be present then operations 508, 510, 512 and 516 are repeated. If the signature value is determined to be absent at operation 506, then at operation 518, the next cluster corresponding to the next cluster address is read. Upon reading the next cluster, operation 512 is performed to check if all clusters from among the plurality of clusters are read. The operations 506 to 518 are repeated till all the clusters corresponding to the file are read from the storage device. If it is determined at operation 512 that all clusters from among the plurality of clusters are read, then file access from the storage device is concluded to be completed at operation 514.

Figure 6:
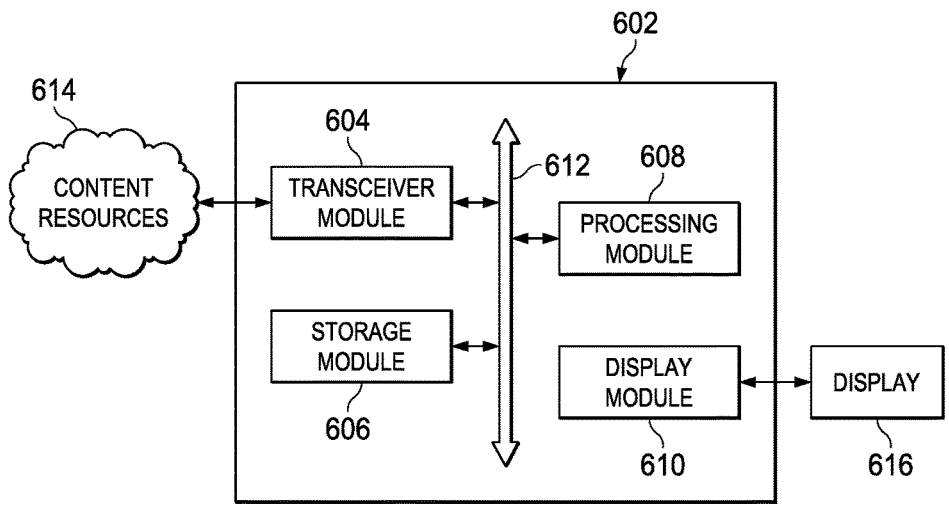
FIG. 6 is a block diagram of an example integrated circuit configured to facilitate the accessing of a file stored in a storage device in accordance with an embodiment.

FIG. 6 is a block diagram of an example integrated circuit 602 in accordance with an embodiment. In an embodiment, the system 200 of FIG. 2 is embodied at least partially in the form of the integrated circuit 602. The integrated circuit 602 includes a transceiver module 604, a storage module 606, a processing module 608 and a display module 610. The transceiver module 604, the storage module 606, the processing module 608 and the display module 610 are communicatively associated or coupled with each other using data path 612. As such, it is noted that at least some of the components described below in connection with the integrated circuit 602 may be optional, and, thus, in an example embodiment the integrated circuit 602 includes more, less or different components than those described in connection with the example embodiment of FIG. 6. In an embodiment, the integrated circuit 602 may include only the storage module 606 and the processing module 608.

The transceiver module 604 is configured to be communicative with content resources 614 for receiving content, such as textual content, graphical content, audio/visual content and the like. Examples of the content resources 614 include, but are not limited to (1) remote multimedia systems (2) media capture devices, such as, for example, a camera, camcorders and the like, and (3) multimedia storage devices, such as, for example, magnetic tapes, disks, computer-readable media, and the like. In an embodiment, the transceiver module 604 may include an antenna and/or network connectors configured to couple with or connect to wired networks (for example, local area networks (LANs)) and wireless networks (for example, cellular networks), or a combination thereof (for example, the Internet).

The storage module 606 is configured to store file content, such as textual content, graphical content, audio/visual content and the like. In an embodiment, the storage module 606 is substantially similar to the storage device 202 of the system 200 of FIG. 2. The storage module 606 is configured to perform functions as discussed in FIG. 2 with reference to storage device 202, which are not repeated herein for the sake of brevity. Examples of the storage module 606 include, but are not limited to, RAM, dual port RAM, SDRAM, DDR SDRAM, and the like.

The processing module 608 is configured to facilitate access to a file stored in the storage module 606. In an embodiment, the processing module 608 is configured to facilitate access to the file and provide the accessed file to the display module 610 for display purposes. In an embodiment, the processing module 608 is substantially similar to the processing module 204 of system 200 of FIG. 2. The processing module 608 is configured to perform functions as discussed in FIG. 2, which are not repeated herein for the sake of brevity.

The display module 610 is configured to facilitate display of the accessed file on a display 616. The display 616 is facilitated, for example, in response to a user input received using a user interface (not shown in FIG. 6). Examples of the display 616 include a liquid crystal display (LCD) panel, a plasma display panel, a field emission display and the like.

In an embodiment, the integrated circuit 602 is an application processor chip. In an embodiment, the integrated circuit 602 is a part of a particular or shared processor chip that is embedded within a multimedia system. Examples of the multimedia system include, but are not limited to, (1) multimedia devices, such as, for example, cellular phones, digital video cameras and digital camcorders and (2) data processing devices, such as, for example, personal computers, laptops and personal digital assistants.

Without in any way limiting the scope, interpretation, or application of the claims appearing below, advantages of one or more of the example embodiments disclosed herein include improving file read performance by facilitating reading of contiguous clusters allocated to a file without a need to switch back and forth for referring to FAT entries. This may be especially useful for file read mechanical arrangements which are capable of reading large amounts of data disposed on a plurality of clusters in one-go (for example, in instances where the storage device 202 is embodied as a hard disk drive, reading of clusters may be aligned with a rotation of a disk platter to capture large amounts of data in one-go). The improvement of file read performance may especially be substantial for large files, like multimedia files (for example, video files), where switching back and forth to read FAT entries may substantially degrade a file read performance. Though Microsoft's ExFat file system utilizes stream extension directory entries for contiguous cluster reads, however, such mechanisms are restricted for only ExFAT file system and are not applicable to FAT file systems, such as FAT32 file system. Moreover, mechanisms utilizing stream extension directory entries may be useful for contiguously reading only those files, which are contiguously written during initial file write operation and are unmodified since. More specifically, such mechanisms are rendered useless for files, which are appended subsequent to initial file write operation. As such, various embodiments of the present technology, however, provide methods, systems, and computer-readable media for accessing files stored in a storage device that are capable of overcoming these and other obstacles and providing additional benefits, such as improved file read performance for FAT file systems, such as FAT32 file system, while precluding complexity.

It is noted that the reading of the contiguous clusters allocated to the file is explained herein in FIGS. 1 to 6 with reference to a FAT file system, such as a FAT32 file system, where the reserved four most significant bits in the cluster address are utilized to store a signature value indicating the presence of contiguous clusters in the file. It is understood that such usage of the most significant four bits is limited to the FAT32 file system. In FAT12 and FAT16 file system, where the complete 12 and 16 bits of FAT entry, respectively, are used to represent the cluster number of the file/directory, a "DIR_NTRes" field (reserved for use by Windows™ NT) of the 32-bytes directory entry structure of the file/directory may be used to indicate the contiguous clusters allocation. It is noted that though the FAT specification indicates that this field is reserved and recommends the value 0 in this field, the Windows NT, XP and higher versions of such operating systems use this field to maintain a case sensitivity of English language alphabets while displaying the "Short File Name" (SFN) and case insensitivity while searching for the SFN. If all 8 characters of a name part of SFN are in lower case, then $4^{th}$ bit of DIR_NTRes field will be set to value 1. Similarly, if all 3 characters of the extension part of SFN are lower case, the $5^{th}$ bit of DIR_NTRes field will be set to 1. The bits other than $4^{th}$ and $5^{th}$ bits of DIR_NTRes field of the 32 bytes directory entry of the file/directory may be used indicate the allocation of contiguous clusters allocation to a file. The usage of bits other than $4^{th}$ and $5^{th}$ bits of DIR_NTRes is applicable to FAT32 file system too. The most significant 4 bits of field "DIR_FstClusHI" (for example, high word of the first cluster number of file/directory) in the 32 bytes directory entry structure of the file/directory may also be used indicate the allocation of contiguous clusters allocation to a file in FAT12, FAT16 and FAT32 File systems. Usage of bits of fields "DIR_NTRes" and "DIR_FstClusHI" of 32-byte directory entry structure for indication of contiguous cluster allocation may function efficiently only if all the clusters of a file are allocated in a one contiguous series. If there are multiple disjoint groups of contiguous clusters allocated to a single file, then usage of most significant 4 bits of FAT entry indicates the number of contiguous clusters for every cluster group.

Although the present technology has been described with reference to specific example embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the storage device 202 and the processing module 204 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the example embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions may be apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A method comprising:
    writing a file to a storage device having a file system that includes a file allocation table (FAT) by:
        allocating a plurality of clusters of the file system to store the file, wherein at least a portion of the allocated plurality of clusters is contiguous, and wherein the FAT comprises a plurality of cluster addresses corresponding to the allocated plurality of clusters;
        storing a signature value in a cluster address corresponding to a first cluster of the contiguous clusters, the signature value indicating the presence of the contiguous clusters; and
        storing, in each of a set of consecutive cluster addresses succeeding the cluster address corresponding to the first cluster of the contiguous clusters, a value that partially represents the number of the contiguous clusters, wherein the number of contiguous clusters is determinable by combining the values stored in each of the set of consecutive cluster addresses.

2. The method as claimed in claim 1, wherein the signature value is stored in a selected number of most significant bits of the cluster address corresponding to the first cluster of the contiguous clusters.

3. The method as claimed in claim 2, wherein each of the plurality of cluster addresses comprises 32 bits.

4. The method as claimed in claim 3, wherein the selected number of most significant bits of the cluster address corresponding to the first cluster of the contiguous clusters is four.

5. The method as claimed in claim 4, wherein, in each of the set of consecutive cluster addresses, the value partially representing the number of the contiguous clusters is stored in a selected number of most significant bits of the 32 bits of each of the set of consecutive cluster addresses.

6. The method as claimed in claim 5, wherein combining the values stored in each of the set of consecutive cluster addresses comprises concatenating the values stored in each of the set of cluster addresses to generate a value indicating the number of contiguous clusters.

7. The method as claimed in claim 6, wherein the set of consecutive cluster addresses comprises four cluster addresses, the selected number of most significant bits of the 32 bits of each of the set of consecutive cluster addresses is four, and concatenating the values stored in each of the set of four consecutive cluster addresses generates a 16-bit value indicating the number of contiguous clusters.

8. The method as claimed in claim 7, wherein the 16-bit value is a hexadecimal value.

9. The method as claimed in claim 7, wherein the value indicating the number of contiguous clusters is equal to a pre-determined value when all remaining clusters of the allocated plurality of clusters are contiguous.

10. The method as claimed in claim 6, wherein the set of consecutive cluster addresses comprises seven cluster addresses, the selected number of most significant bits of the 32 bits of each of the set of consecutive cluster addresses is four, and concatenating the values stored in each of the set of seven consecutive cluster addresses generates a 28-bit value indicating the number of contiguous clusters.

11. The method as claimed in claim 1, wherein the signature value is stored as a non-zero value to indicate the presence of the contiguous clusters.

12. The method as claimed in claim 1, comprising:
reading the file from the storage device by:
  determining a plurality of cluster addresses corresponding to the allocated plurality of clusters to which the file is stored;
  reading the cluster address corresponding to the first cluster of the contiguous clusters;
  determining the presence of the signature value in the cluster address corresponding to the first cluster; and
  when the signature value determined to be present in the cluster address corresponding to the first cluster, determining the number of contiguous clusters that follows the first cluster by combining the values partially representing the number of contiguous clusters stored in the set of consecutive cluster addresses immediately succeeding the cluster address corresponding to the first cluster.

13. The method as claimed in claim 12, comprising, after determining the number of contiguous clusters, reading the contiguous clusters without referring the FAT.

14. The method as claimed in claim 1, wherein the file system is a FAT32 file system.

15. A file system comprising:
a storage device configured to store a file;
a memory configured to store a set of instructions; and
a processing module communicatively associated with the storage device and the memory, the processing module configured to execute the set of instructions to store the file to the storage device by:
  allocating a plurality of clusters of a file system of the storage device for storing the file, wherein at least a portion of the allocated plurality of clusters is contiguous, and wherein a file allocation table (FAT) of the file system comprises a plurality of cluster addresses corresponding to the allocated plurality of clusters;
  storing the file into the allocated plurality of clusters;
  storing a signature value in a cluster address corresponding to a first cluster of the contiguous clusters, the signature value indicating the presence of the contiguous clusters; and
  storing, in each of a set of consecutive cluster addresses succeeding the cluster address corresponding to the first cluster of the contiguous clusters, a value that partially represents the number of the contiguous clusters, wherein the number of contiguous clusters is determinable by combining the values stored in each of the set of consecutive cluster addresses.

16. The file system as claimed in claim 15, wherein the signature value is stored in a selected number of most significant bits of the cluster address corresponding to the first cluster of the contiguous clusters.

17. The file system as claimed in claim 16, wherein the selected number of most significant bits of the cluster address corresponding to the first cluster of the contiguous clusters is four.

18. The file system as claimed in claim 17, wherein, in each of the set of consecutive cluster addresses, the value partially representing the number of the contiguous clusters is stored in a selected number of most significant bits of each of the set of consecutive cluster addresses.

19. The file system as claimed in claim 18, wherein combining the values stored in each of the set of consecutive cluster addresses comprises concatenating the values stored in each of the set of cluster addresses to generate a value indicating the number of contiguous clusters.

20. The file system as claimed in claim 15, wherein each of the plurality of cluster addresses comprises 32 bits.

* * * * *